United States Patent Office 2,813,592
Patented Nov. 19, 1957

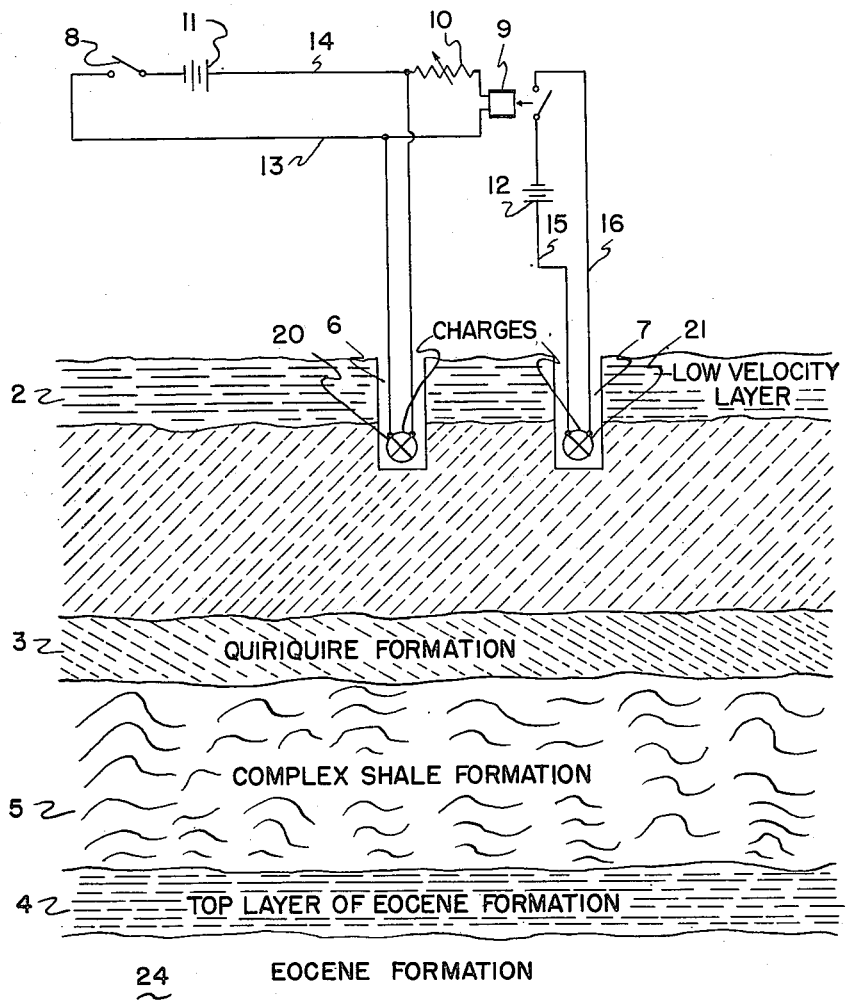
Joseph F. Bayhi  Inventor
By W. N. Wright  Attorney

2,813,592

SEISMIC PROSPECTING

Joseph F. Bayhi, Tulsa, Okla., assignor to Esso Research and Engineering Company, a corporation of Delaware Application December 6, 1954, Serial No. 473,296

5 Claims. (Cl. 181—.5)

The present invention is broadly concerned with a seismic method of geophysical exploration. More particularly it relates to a method for locating and profiling thick and well defined formations which underlie complex formations that may consist for example of a plurality of relatively thin beds that are highly irregular in their configuration.

The use of seismic procedures in geophysical exploration is well known. In such procedures a charge of explosive material such as dynamite is detonated to form a shock wave which is transmitted through the surrounding earth. The intervals of time required for the wave to reach sensitive detectors located at different points removed from the exploding charge are measured; and from these data it is possible to deduce considerable information concerning the nature of the subterranean formations. Generally speaking seismic waves are characterized by possessing frequencies from about 30 to 60 cycles per second with corresponding periods of from about 17 to 33 milliseconds.

Seismic methods of geophysical exploration are particularly valuable in prospecting for oil or other mineral deposits. It has repeatedly been observed that seismograph records are very effective aids in detecting and identifying subterranean formations that are very apt to be prolific oil reservoirs. Accordingly seismology and seismic prospecting has received considerable attention and development by the petroleum industry.

In applying seismology to petroleum prospecting operations, numerous variations of the basic seismic process have been employed to solve particular exploration problems. Thus, it is a very common practice to employ charges of dynamite or other explosive that vary considerably in size depending upon the size of the signal which is desired. Furthermore, explosive charges have been placed above, adjacent and below the surface in efforts to realize the best possible results in certain cases. Again, the charges have been fired in linear arrays as well as in more complex patterns such as helices, squares, triangles, etc. The charges have also been fired in a sequential manner in order to provide directional seismic waves, as for example where it is necessary to profile formations characterized by peculiar dips and the like.

In spite of the great number of explosive charge patterns nad procedures that have been developed to date, a condition has recently been encountered which is not susceptible of satisfactory analysis using any of these procedures. This condition or situation is one in which relatively thick and well defined formations have been found to exist beneath very complex formations consisting, for example, of a multiplicity of relatively thin beds arranged in a highly irregular manner. It has been particularly observed that it is virtually impossible when using existing seismic prospecting techniques to obtain satisfactory information concerning the structural nature and profile of the thick beds that underlie these complex structures. In every instance the reflected waves from the complex structures are also complex and provide seismograph records which are extremely difficult to interpret and evaluate. At this point it will be noted that relatively thin beds in the present description are considered to be beds from about 25 to 100 feet thick, and relatively thick beds are beds having thicknesses in excess of this range.

In view of the inability of existing seismic procedures to cope with the above described problem, it is an object of the present invention to provide a procedure which satisfactorily solves and disposes of this problem. It is specifically an object of the invention to provide a seismic procedure which in turn provides seismograph records that are substantially free of the complications that are introduced by the presence of relatively complex, thin bed formations. It is further a particular object of the invention to enable persons employing seismic prospecting apparatus to obtain intelligible and satisfactory information concerning relatively thick subterranean beds and formations that underlie extremely complex beds and formations.

These and other related objects are realized in accordance with the invention by firing a plurality of seismic explosive charges at substantially a point source and in a firing sequence which is timed to generate a seismic shock wave having an effectively increased wave length or period. In other words the wave length and the period of the shock wave that is obtained by the explosion of a single charge is effectively increased to the point where the resulting wave is of a character such that it lacks the resolution neecssary to portray the structure of the complex formations and yet retains the resolution necessary to portray the structure of the thick underlying formations. Thus, it becomes possible with the present invention to substantially eliminate the presence of the complex formation in so far as seismograph records are concerned and to provide a clearer picture and more reliable information concerning the thick formations that underlie the complex formation.

In accordance with the invention it is contemplated that the wave length of the shock wave which is provided by detonating a plurality of explosive charges should be at least about four times the thickness of the complex beds that it is desired to effectively eliminate from the seismograph records. The wave length of the lengthened wave should not be so great, however, as to lack th resolution necessary for identifying and evaluating the thick underlying formations.

It is also necessary in accordance with the present invention to place the individual charges of explosive as close to one another as possible without causing the explosion of one charge to automatically set off any of the other charges. In this connection it has been found in average formations that charges consisting of up to about 50 lbs. of dynamite may be exploded within about 20 feet of one another without encountering this difficulty. By maintaining a close physical relationship between the charges, it is possible to obtain essentially a single point source for the explosions and to eliminate any directional effects which are undesirable when attempting to obtain accurate knowledge concerning the structure of a wide subterranean area.

In locating the charges of explosive, it is also desirable that each charge be detonated at the bottom of a separate shot hole about 20 to 30 feet below the low velocity layer. At this point it will be noted that the existence of the low velocity layer immediately adjacent the earth's surface is a well known matter in the art, and it is therefore not considered necessary in the present description to discuss the nature or effect of this layer in any greater detail. It is only necessary in accordance with the present invention that the charges of explosive be placed within about five feet of the same elevation and preferably from 20 to 30 feet beneath the low velocity layer.

The charges should not be fired within the low velocity layer, nor on the surface of the earth, nor in the air above the earth. Furthermore, the charges in any given firing sequence should not be fired at substantially different elevations, nor in different formations. It has been observed that these procedures introduce complicating factors which are undesirable and only serve to create additional seismic interpretation problems.

In firing the charges in the present process, it is necessary to have each succeeding charge be fired at an interval of time after the preceding charge equal in value to from about 0.2 to 0.4 and preferably about 0.33 times the period of the wave produced by the preceding charge. In other words, if each charge of explosive produces a seismic wave having a period of 30 milliseconds, then it is necessary that each charge be fired about 6 to 12 milliseconds and preferably about 10 milliseconds after the immediately preceding charge. It is further contemplated that no more than two such charges are required in most instances; and it is further contemplated that about 3 to 4 charges are sufficient in substantially all situations. The charges that are employed may be any of the conventional materials used in seismograph prospecting such as dynamite, TNT, etc.; and the charges may be utilized in conventional sizes ranging from about 5 to 50 lbs. each. Furthermore the charges may be fired utilizing the usual electrical circuits and firing caps, arranged and adapted to provide the aforesaid firing intervals that are necessary. The detectors and seismographs may be any of the conventional types.

Having pointed out the essential features of the present invention, attention is now directed toward the following specific example which is intended to aid in understanding the nature and scope of the invention. And, in order to better understand and present the example, attention is further directed toward the attached figure which illustrates the geophysical problem which was confronted in the example.

Turning to the figure it will be seen that the geological structure of interest in the example was one that included a low velocity layer 2, a Quiriquire formation 3, an Eocene formation 24 and an intermediate and extremely complex shale formation 5.

The low velocity layer extended about 50 feet down from the surface of the earth and the Quiriquire formation was about 200 feet thick and started about 3000 feet below the surface of the earth. Beneath the latter formation there existed the shale formation 5 which was about 3000 feet thick and which consisted of a plurality of highly irregular and complex shale beds some 30 to 100 feet thick each. The top layer of the Eocene formation 4 beneath this shale formation was about 500 feet thick and started about 6000 feet below the surface of the earth.

In the example it was desirable and necessary to ascertain information concerning the structure of the Eocene top layer 4 described above. When utilizing the usual seismic detectors, seismographs and single explosive charges, it was found that the seismic information relating to the Eocene top layer was completely masked by the confused information received from the complex shale formation. In an effort to cope with this situation, the usual existing conventional seismic prospecting variations were employed, but it was impossible to obtain any better information by employing these techniques. When the process described herein was finally used, however, markedly improved results were obtained. The following specific procedure was employed.

Two shot holes 6 and 7 were drilled about 20 feet apart and down to about 30 feet below the low velocity layer. A charge of about 50 lbs. of dynamite was placed in each separate hole and the leads from the charges were connected in the firing circuit illustrated. This circuit included a firing switch 8, a relay 9, a variable resistor 10, two batteries 11 and 12 and charges 20 and 21. The firing circuit was operated in the following manner. At the time desired for firing, switch 8 was closed which completed a first circuit and caused current to flow through leads 13 and 14. With the completion of this circuit, charge 20 exploded and sent a shock wave down through the underlying formations. It was ascertained that the wave under these conditions had a period of about 30 milliseconds.

As a result of the current flowing through the first circuit including variable resistor 10, relay 9 was actuated about 11 milliseconds after the closing of switch 8. With the actuation of the relay current was now transmitted through leads 15 and 16 causing charge 21 to explode. As a result of the sequential explosions resulting from the two charges, a seismic wave was produced having an effective period of about 41 milliseconds, and this wave provided a distinct reflection of the layer 4 with an effective reduction of the interference from the complex formation 5. Time intervals of 18 and 27 milliseconds between the firing of the two charges were also employed by adjusting the variable resistor 10, but neither of the waves produced by these intervals was as effective as the wave produced by the 11 millisecond delay.

It is apparent from the above example that the present invention is extremely effective in avoiding the seismographic problems that are presented by subterranean formations which are complex and which consist of relatively shallow beds. It is further apparent that a number of modifications and changes may be made in the procedure of the invention without departing from the spirit or scope thereof. For example a number of different electronic and electrical circuits may be utilized for achieving the sequential firing program desired. Again, a wide variety of seismic detectors and seismographs may be utilized. Finally, more than two charges may be employed, and the size of these charges may be varied as desired.

What is claimed is:

1. In seismic prospecting the method of increasing the effective period of the shock wave imparted by the explosion of a single charge which comprises exploding a second such charge a short interval of time after the first charge, said time interval being from about 0.2 to 0.4 times the value of the effective period of the shock wave from the first charge, both charges being exploded about 20 to 30 feet beneath the low velocity layer and within about 5 feet of the same elevation, both charges being laterally apart a distance sufficient to prevent the explosion of the first charge from setting off the second charge.

2. A method as claimed in claim 1 in which the time interval between the first and second charges is about 0.33 times the effective period of the shock wave from the first charge.

3. In seismic prospecting a region where a relatively thick subterranean bed underlies a complex formation consisting of a plurality of relatively thin and irregular beds, the method of obtaining an improved seismic reflection from the underlying bed which comprises drilling a plurality of shot holes so that the bottoms of the holes are at substantially the same elevation and about 20 to 30 feet beneath the low velocity layer, placing a separate charge of explosive at the bottom of each hole, each hole being laterally as close to every other such hole as possible without causing the explosion of one charge to set off an adjacent charge, firing the charges sequentially such that each charge is fired at an interval of time after the preceding charge equal to about 0.2 to 0.4 times the effective period of the shock wave which is generated by the preceding charge, the number of charges in the sequence being sufficient to provide a composite shock wave having a wave length at least about 4 times as great as the thickness of the thin irregular beds.

4. A method as defined in claim 3 in which each charge is fired at an interval of time after the preceding charge equal to about 0.33 times the effective period of the shock wave which is generated by the preceding charge.

5. A method as defined in claim 3 in which the bottoms of the shot holes are within about 5 feet of the same elevation.

References Cited in the file of this patent
UNITED STATES PATENTS

| | | |
|---|---|---|
| 2,156,198 | Scherbatokiy | Apr. 25, 1939 |
| 2,390,187 | Sharpe | Apr. 4, 1945 |